(12) United States Patent
Sanne (10) Patent No.: US 12,453,987 B1
(45) Date of Patent: Oct. 28, 2025

(54) ROTARY DRUM SCREENER FOR SEPARATING DIFFERENTLY SIZED PLASTIC PIECES AND FILTERING OUT STRANDS

(71) Applicant: EBM Manufacturing, Inc., Norfolk, NE (US)

(72) Inventor: Scott Ronald Sanne, Norfolk, NE (US)

(73) Assignee: EBM Manufacturing, Inc., Norfolk, NE (US)

( * ) Notice: Subject to any disclaimer, the term of this patent is extended or adjusted under 35 U.S.C. 154(b) by 0 days.

(21) Appl. No.: 18/770,455

(22) Filed: Jul. 11, 2024

(51) Int. Cl.
*B07B 1/24* (2006.01)
*B07B 1/46* (2006.01)
*B07B 1/55* (2006.01)

(52) U.S. Cl.
CPC .............. *B07B 1/24* (2013.01); *B07B 1/4609* (2013.01); *B07B 1/55* (2013.01)

(58) Field of Classification Search
CPC ............ B07B 1/24; B07B 1/4609; B07B 1/55
USPC ........................................................ 209/270
See application file for complete search history.

(56) References Cited

U.S. PATENT DOCUMENTS

| | | | | |
|---|---|---|---|---|
| 3,549,014 A | * | 12/1970 | Renzo | ........................ B07B 1/24 210/408 |
| 6,955,265 B2 | * | 10/2005 | Tse | ........................ B02C 17/007 209/288 |
| 10,814,522 B2 | * | 10/2020 | Walker | ........................ B08B 5/02 |
| 12,121,934 B2 | * | 10/2024 | Gomez | ........................ B07B 1/24 |
| 2020/0206661 A1 | | 7/2020 | DeWaard | |

OTHER PUBLICATIONS

Invitation to Pay Additional Fees from International Application No. PCT/US2025/037122 dated Sep. 17, 2025, 3 pp.

* cited by examiner

*Primary Examiner* — Michael McCullough
*Assistant Examiner* — Jessica L Burkman
(74) *Attorney, Agent, or Firm* — Shumaker & Sieffert, P.A.

(57) ABSTRACT

A rotary drum screener includes a feeder and a rotary drum. The feeder is configured to receive plastic pieces and direct the plastic pieces through an opening within a rotary bearing. The rotary drum is connected to the rotary bearing and configured to receive the plastic pieces from the feeder. The rotary drum includes a helical blade surrounded by a perforated screen that is transmissive to plastic pieces with a diameter smaller a maximum hole diameter of the screen. The rotary drum screener further includes means for preventing or mitigating blockages including: at least one air nozzle configured to blow air into the rotary drum; at least one air nozzle configured to blow air into the feeder; and/or a second helical blade that extends from the rotary drum into the feeder to prevent or mitigate blockages by agitating the plastic pieces as they pass through the feeder.

11 Claims, 11 Drawing Sheets

ROTARY DRUM SCREENER FOR SEPARATING DIFFERENTLY SIZED PLASTIC PIECES AND FILTERING OUT STRANDS

TECHNICAL FIELD

The present disclosure generally relates to screening systems for separating differently sized pieces of dry goods.

BACKGROUND

Rotary drum screeners are currently used to separate differently sized pieces of dry goods, predominantly in the grain, feed pellet, wood pellet, pet food, salt, and edible bean industries, with some other applications such as fertilizer, mineral, rubber, and range cubes. There are also applications in the plastics industry that may benefit from the use of rotary drum screeners to separate differently sized plastic pieces and to filter out strands.

Plastic strands, sometimes referred to as "angel hairs," occur when hot pieces of plastic are stretched out. Angel hairs are commonly found in batches of plastic pellets, beads, and other types of plastic pieces as a result of manufacturing processes.

Plastic pieces are more challenging to separate than other dry goods because of angel hairs that are hard to filter out and have a tendency to get caught on screening equipment. Plastics are also prone to static electricity formation, which can cause plastic pieces to stick together and to screening equipment. Existing systems may not be suitable for screening plastics because of these challenges. Consequently, there is a need for improved screening equipment that can prevent blockages from causing system failures and/or poor screening performance.

SUMMARY

This disclosure presents a rotary drum screener for separating differently sized plastic pieces and filtering out strands. In embodiments, the rotary drum screener includes a feeder and at least one rotary drum. The feeder is configured to receive plastic pieces to be screened and is further configured to direct the plastic pieces through an opening within a rotary bearing. The rotary drum is connected to the rotary bearing and configured to receive the plastic pieces from the feeder. The rotary drum includes a helical blade surrounded by a perforated screen that is transmissive to plastic pieces with a diameter smaller a maximum hole diameter of the screen.

In some embodiments, the rotary drum includes multiple drum screen sections with increasing or decreasing (typically increasing) maximum hole diameter from one drum screen section to the next, or the rotary drum may be connected to one or more additional rotary drum sections with increasing/decreasing maximum hole diameter from one rotary drum screen section to the next.

The rotary drum screener further includes means for preventing or mitigating blockages that result from pieces of plastic sticking together or to equipment due to static electricity formation and/or plastic strands getting caught in equipment. For example, the rotary drum screener may include: at least one air nozzle configured to blow air into the rotary drum to prevent or mitigate blockages in the rotary drum; at least one air nozzle configured to blow air into the feeder to prevent or mitigate blockages in the feeder; and/or a second helical blade that extends from the rotary drum into the feeder to prevent or mitigate blockages in the feeder (or between the feeder and the drum) by agitating the plastic pieces as they pass through the feeder.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The Detailed Description is provided with reference to the accompanying Drawings. The use of the same reference numbers in different instances in the Detailed Description and the Drawings may indicate similar or identical items. The Drawings are not necessarily to scale, and any disclosed processes may be performed in an arbitrary order, unless a certain order of steps/operations is inherent or specified in the Detailed Description or in the Claims.

DETAILED DESCRIPTION

The present disclosure describes systems and methods for screening plastics to separate differently sized plastic pieces and filter out plastic strands (sometimes referred to as "angel hairs"). Examples of "plastic pieces" include, but are not limited to, plastic pellets, beads, any other type of geometrically shaped or irregular bits of plastic, and small or fine particles (e.g., granules, dust, etc.). A batch of plastic pieces may also include plastic strands or angel hairs that occur when hot pieces of plastic are stretched out, often as a result of manufacturing processes. Plastic pieces are more challenging to separate than other dry goods because of angel hairs that are hard to filter out and have a tendency to get caught on screening equipment. Plastics are prone to static electricity formation, which can cause plastic pieces to stick together and to screening equipment. The systems and methods disclosed herein are capable of preventing or mitigating blockages that can result from plastic pieces and/or angel hairs sticking together and to screening equipment.

Example embodiments of a rotary drum screener 100 for separating differently sized plastic pieces and filtering out strands are discussed below with reference to FIGS. 1 through 11. Those skilled in the art will appreciate that the embodiments illustrated in FIGS. 1 through 11 are specific examples that can be modified by changing dimensions or adding/removing non-essential components or fillers. Furthermore, two or more embodiments (or portions thereof) can be combined to achieve an additional embodiment that is not necessarily shown or described with reference to one drawing. As such, the drawings should not be construed as restrictive of any particular embodiment and are intended instead as visual aids to help describe configurations of certain components that may apply to multiple embodiments of the rotary drum screener 100.

Figure 1:
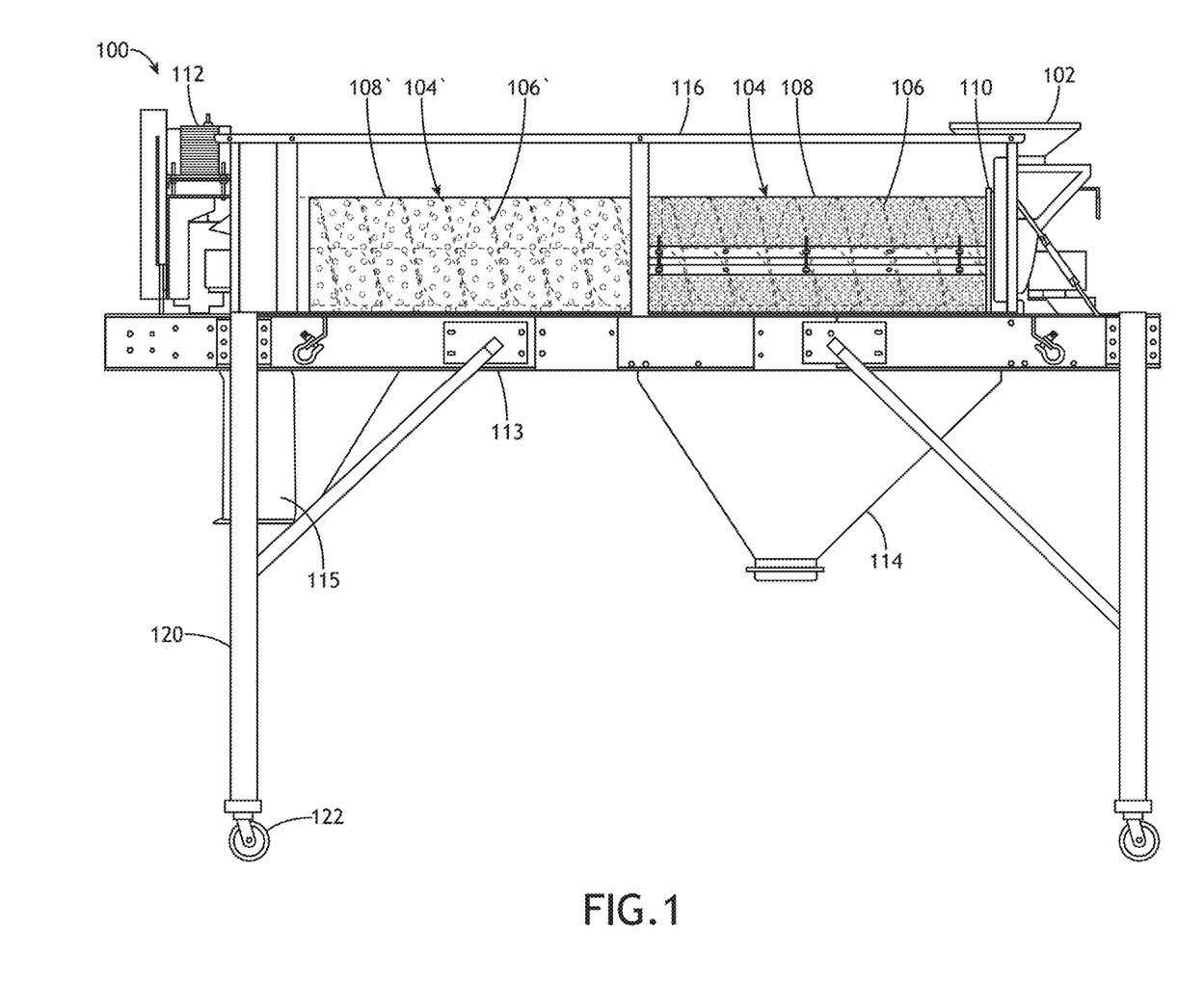
FIG. 1 is a side view of a rotary drum screener for separating differently sized plastic pieces and filtering out strands, wherein drum cover portions of a screener housing are removed, in accordance with an example embodiment of the present disclosure.

As shown in FIG. 1, the rotary drum screener 100 includes a feeder 102 and at least one rotary drum 104. The feeder 102 is configured to receive plastic pieces to be screened and is further configured to direct the plastic pieces through an opening within a rotary bearing 110 that is adjacent to the feeder 102. For example, the feeder 102 may comprise a hopper or chute that flows into the opening within the rotary bearing 110. The rotary drum 104 is connected to the rotary bearing 110 and is configured to receive the plastic pieces from the feeder 102.

The rotary drum 104 includes a helical blade 106 surrounded by a perforated screen 108 that is transmissive to plastic pieces with a diameter smaller a maximum hole diameter of the screen 108. The helical blade 106 and the perforated screen 108 are preferably coupled together and configured to rotate at the same time, such that the helical blade 106 and the perforated screen 108 have no relative motion between one another. This causes plastic pieces to move through a helical path while the drum 104 is rotating, from one end of the drum 104 to the other, except for those pieces having a small enough diameter to pass through the perforated screen 108. In alternative embodiments, the helical blade 106 may be configured to rotate within the perforated screen 108 and/or at a different rate of rotation than the perforated screen 108.

The perforated screen 108 is preferably made of sheet metal with holes that are cut (e.g., laser cut) into the sheet metal. The holes may be round (e.g., circular) or any other shape. In the case of non-circular holes, the term "maximum hole diameter" is defined as the maximum distance across the hole. The sheet metal may be bent/rolled to form a hollow, open-ended, cylinder shaped perforated screen. In alternative embodiments, the perforated screen 108 may be formed by a wire mesh that is bent/rolled to form a hollow, open-ended, cylinder shaped perforated screen. However, perforated screens made of sheet metal may perform better for screening plastics because they have smoother and flatter surfaces that are less prone to catching on plastic strands.

In embodiments, the rotary drum 104 may include multiple drum screen sections with increasing or decreasing (typically increasing) maximum hole diameter from one drum screen section to the next, or the rotary drum 104 may be connected to one or more additional rotary drums (e.g., drum 104') with increasing/decreasing maximum hole diameter from one rotary drum to the next. For example, FIG. 1 shows the rotary drum 104 connected to a second drum 104' that is similarly structured. The rotary drums 104 and 104' may be separately constructed drums that are fused together, or they can be different sections of the same drum. Within the rotary drums 104 and 104', helical blades 106 and 106' are also fused together, or sections of the same blade, such that the helical path extends all the way through both of the rotary drums 104 and 104'. The rotary drum screener 100 may include any number of drums/sections that are similarly configured, where the perforated screen 108 of the first drum 104 has a smaller maximum hole diameter than the perforated screen 108' of the second drum 104', and so on.

Figure 8:
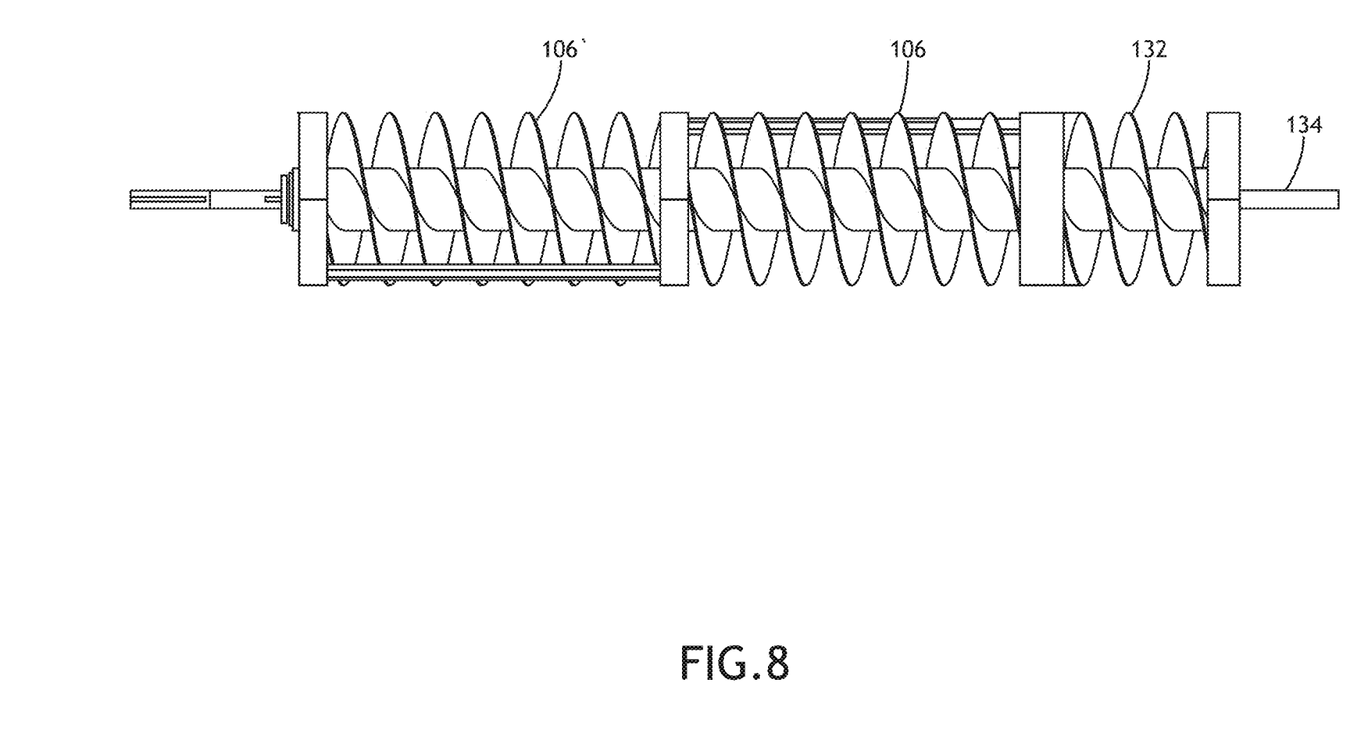
FIG. 8 is a top view of an integrated helical blade assembly by itself, in accordance with an example embodiment of the present disclosure.

The rotary drum screener 100 may further include a motor 112 that is configured to rotate the rotary drum 104 and any additional drums/sections (e.g., drum 104', etc.). For example, the motor 112 may be configured to rotate blade 106 and any additional blades/sections (e.g., blade 106', etc.), thereby causing the drum(s) to rotate. As shown in FIG. 8, the helical blades/sections (e.g., blade 106, blade 106', etc.) may be configured to rotate about a common axle 134. In some embodiments, this axle 134 is driven by the motor 112 with the blades being fixedly coupled to the axle 134. Alternatively, the motor 112 may be configured to rotate the blades on the axle 134 with the blades being rotatably coupled to the axle 134. The motor 112 is preferably an electric motor; however, other types of motors (e.g., gas powered) can also be used.

Figure 2:
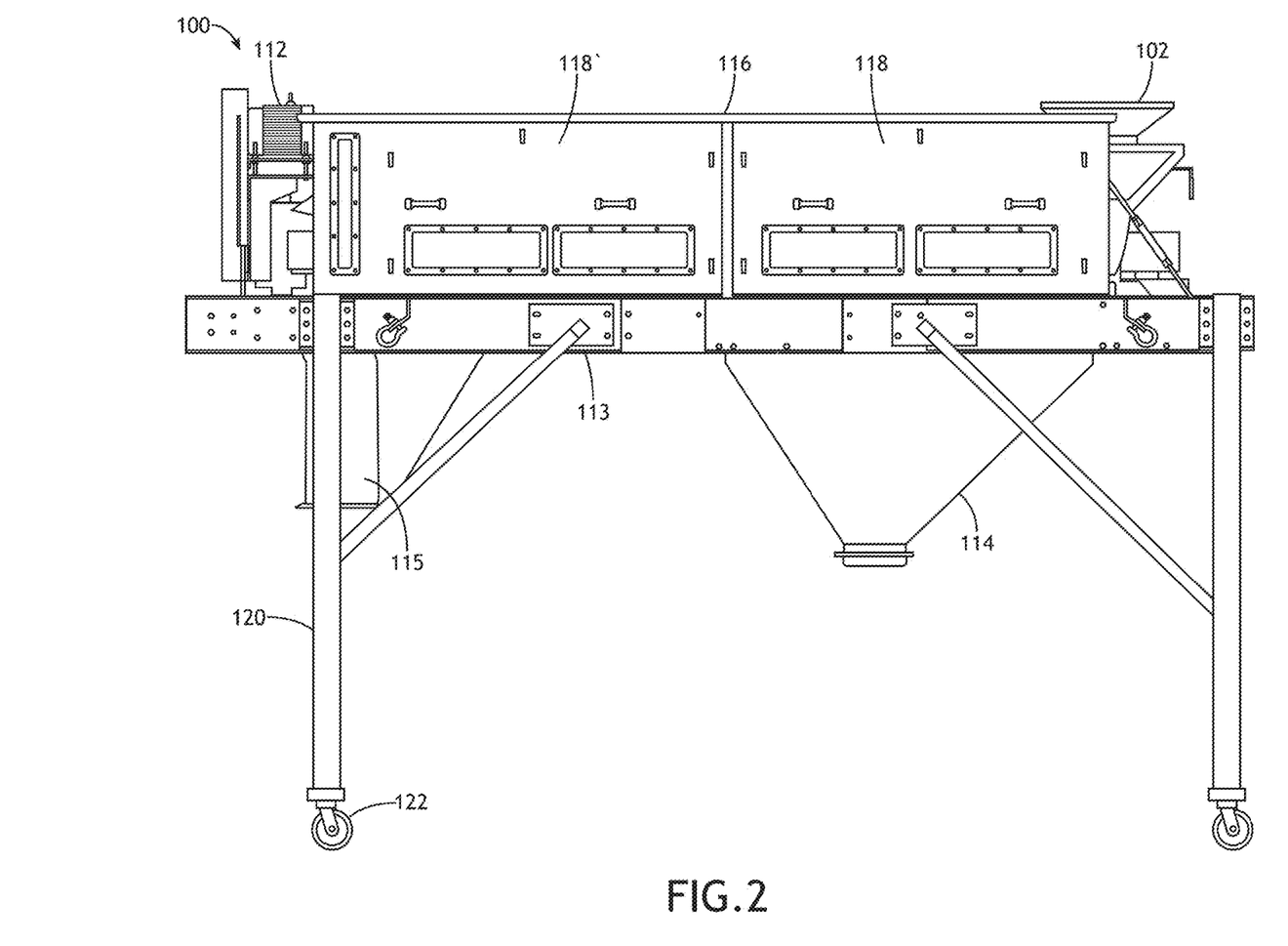
FIG. 2 is a side view of the rotary drum screener of FIG. 1, wherein the drum cover portions of the housing are in place, in accordance with an example embodiment of the present disclosure.

The rotary drum 104 and any additional drums/sections (e.g., drum 104', etc.) may be contained within a housing 116 for the screener. FIG. 1 shows the housing with side covers 118 and 118' removed to show the drums 104 and 104'; however, the side covers 118 and 118' are shown in FIG. 2. The bottom 113 of the housing 116 may be open so that plastic pieces small enough to pass through a drum/section of the rotary drum screener 100 are allowed to drop below the respective drum/section at which they were separated from other (larger) plastic pieces that continue to move through the rotary drum screener 100.

Figure 5:
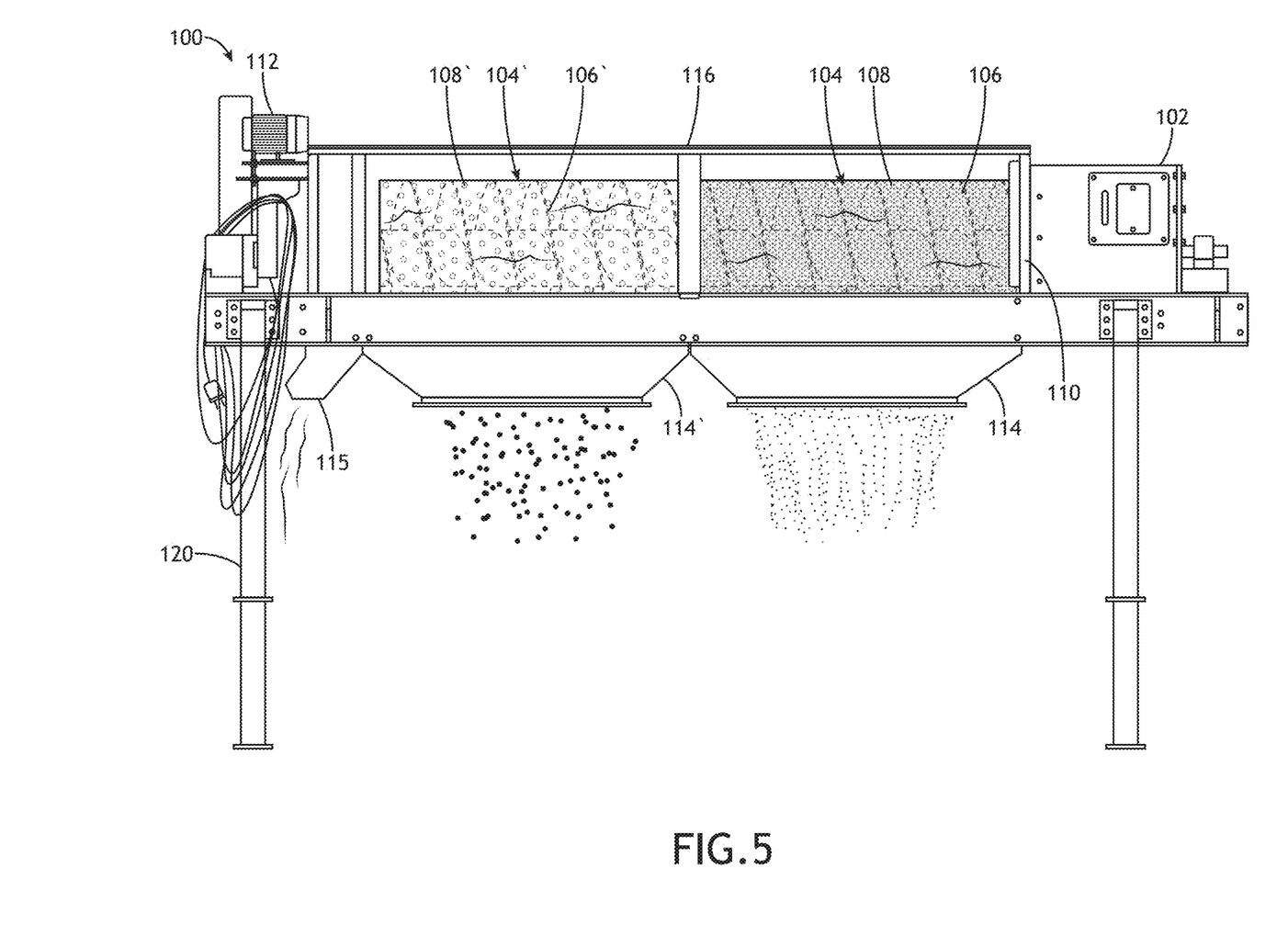
FIG. 5 is a side view of a rotary drum screener for separating differently sized plastic pieces and filtering out strands, wherein drum cover portions of a screener housing are removed, and wherein the rotary drum screener includes an elongated feeder with a helical blade that extends from the rotary drum into the feeder to prevent or mitigate blockages by agitating plastic pieces as they pass through the feeder, in accordance with an example embodiment of the present disclosure.

As the drum 104 rotates, gravitational forces cause plastic pieces to travel through a helical path defined by space between the helical blade 106 and the perforated screen 108. Plastic pieces with a small enough diameter to fit through the holes of the perforated screen 108 fall through the bottom 113 of the housing 116 and are separated from other (larger) plastic pieces that continue to move through the rotary drum screener 100. The housing 116 may be equipped with a chute 114 below the drum 104 to capture and direct the separate plastic pieces into a dedicated container or pile beneath the chute 114. The remaining plastic pieces may continue through the helical path within an adjacent drum/section (e.g., drum 104'), and so on, until reaching an end of the rotary drum screener 100. At the end of the rotary drum screener 100, any remaining plastic pieces may be discharged from an end of the last drum/section into a discharge chute 115. In some embodiments, the rotary drum screener 100 may include respective chutes (e.g., chutes 114 and 114') for each of the drums/sections (e.g., drum 104 and 104') in the system, for example, as shown in FIG. 5.

The rotary drum screener 100 may further include a structural frame 120 (e.g., a plurality of vertical supports or scaffolding) configured to support the housing 116 at a certain height above the ground. As shown in FIGS. 1 and 2, in some embodiments, the structural frame 120 has a plurality of wheels/casters 122 at the bottom of the structural frame 120 so that the rotary drum screener 100 can be easily transported (e.g., wheeled) from one location to another.

As previously noted, screening plastics is quite challenging due to the presence of plastic strands (aka "angel hairs") and because plastics are prone to static electricity formation, which can cause plastic pieces and/or angel hairs to stick together and to screening equipment. To overcome these challenges, the rotary drum screener 100 may include various means for preventing or mitigating blockages that result from pieces of plastic sticking together or to equipment due to static electricity formation and/or plastic strands getting caught in equipment.

Figure 3:
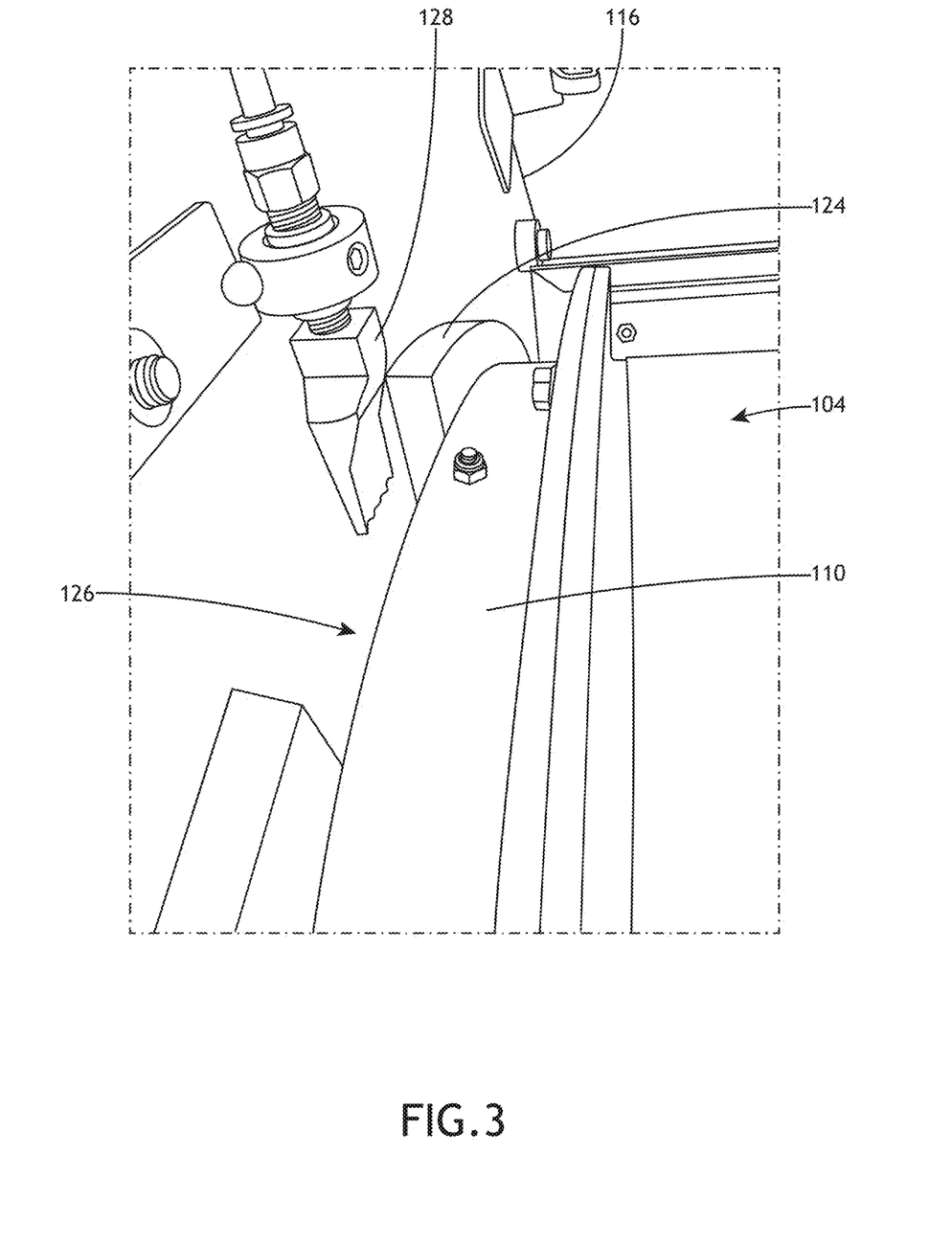
FIG. 3 is a perspective view of an inner portion of a rotary drum screener (e.g., as shown in FIG. 1 or FIG. 5), wherein a collar is coupled between a rotary bearing and an inner surface of the housing, and wherein at least one air nozzle is mounted to the inner surface of the housing and oriented to blow air into a rotary drum of the rotary drum screener through a notch in the collar, in accordance with an example embodiment of the present disclosure.

In some embodiments, the rotary drum screener 100 includes at least one air nozzle 128 configured to blow air into the rotary drum 104 to prevent or mitigate blockages, for example, as shown in FIG. 3. FIG. 3 is a perspective view of an inner portion of the rotary drum screener 100 (e.g., as shown in FIG. 1 or FIG. 5), wherein a collar 124 is coupled between the rotary bearing 110 and an inner surface of the housing 116. The collar 124 may be used to mount the rotary bearing 110 to the inner surface of the housing 116, and the rotary drum 114 may be rotatably coupled to the rotary bearing 110. The air nozzle 128 may be mounted to the inner surface of the housing 116 and oriented to blow air into the rotary drum 104 through a notch 126 in the collar 124. This configuration provides certain advantages as the air nozzle 128 because it allows the air nozzle 128 to blow air directly onto the helical blade 106 as the drum 104 rotates within the bearing 110. However, other placements are possible. For example, in an alternative embodiment, the nozzle 128 could be configured to blow air through the perforated screen 108 of the rotary drum 104, or the system may include the air nozzle 128 as shown in FIG. 3 with at least one additional air nozzle that is configured to blow air through the perforated screen 108. Furthermore, additional drums/sections (e.g., drum 104', etc.) may be configured with one or more air nozzles in a similar manner as described above with regard to rotary drum 104.

Figure 4:
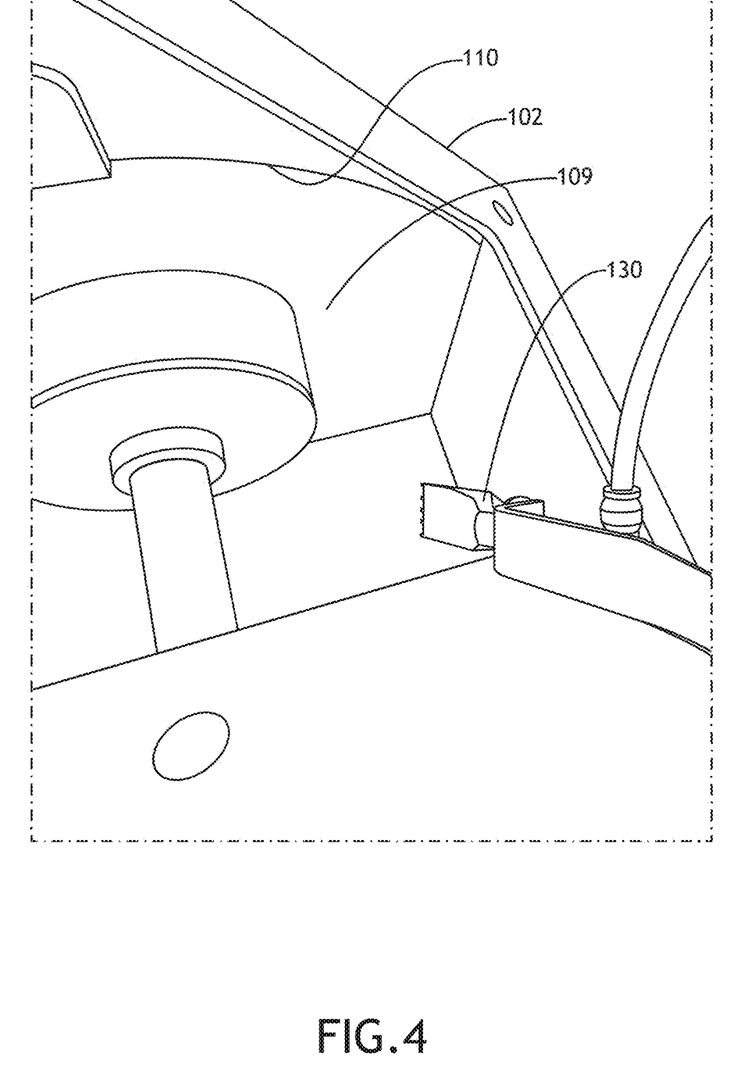
FIG. 4 is a perspective view of a feeder portion of the rotary drum screener of FIG. 1, wherein at least one air nozzle is mounted to an outer rim of the feeder and oriented to blow air toward an opening within the rotary bearing through which plastic pieces are fed into a rotary drum of the rotary drum screener, in accordance with an example embodiment of the present disclosure.
Figure 9:
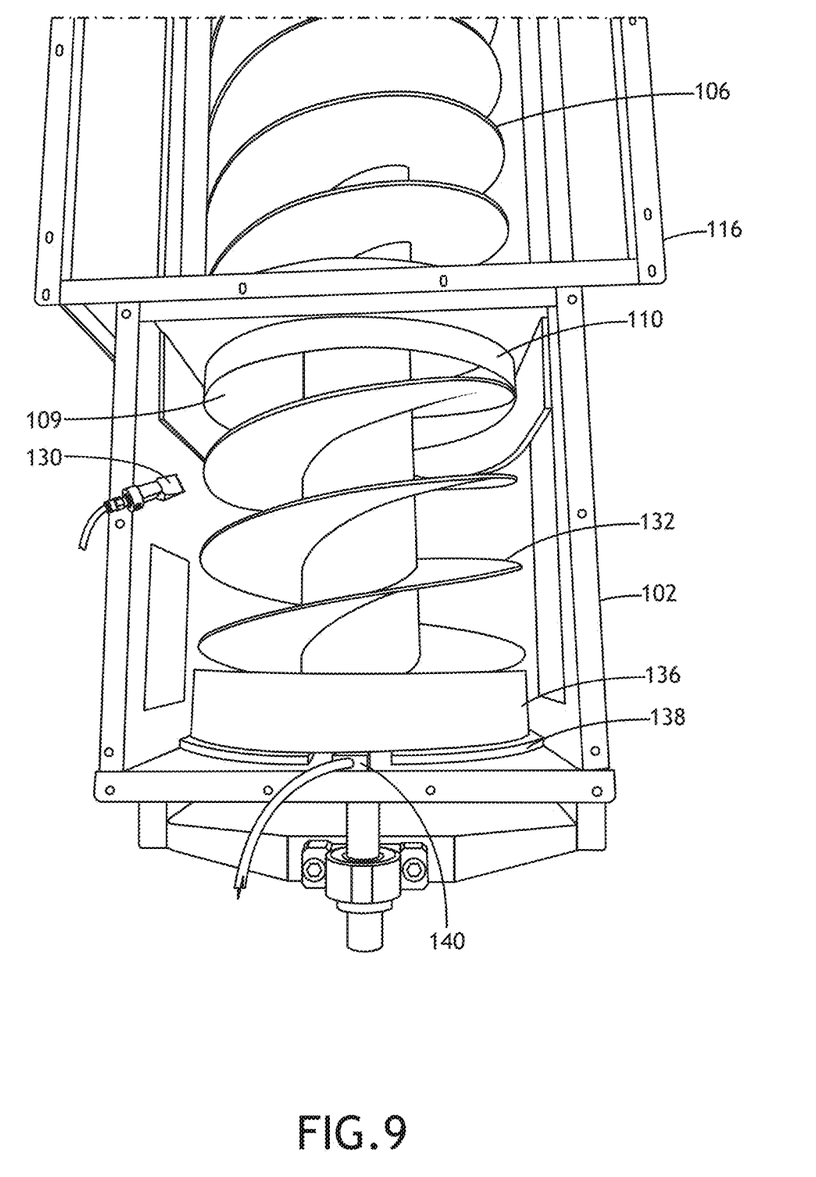
FIG. 9 is a perspective view of a feeder portion of the rotary drum screener of FIG. 5, wherein at least one air nozzle is mounted to an outer rim of the feeder and oriented to blow air toward an opening within the rotary bearing through which plastic pieces are fed into a rotary drum of the rotary drum screener, and wherein at least one air nozzle is mounted to an outer rim of the feeder and oriented to blow air onto the helical blade that extends into the feeder, in accordance with an example embodiment of the present disclosure.

Additionally, or alternatively, the rotary drum screener 100 may include at least one air nozzle 130 configured to blow air into the feeder 102 to prevent or mitigate blockages, for example, as shown in FIG. 4 or FIG. 9. FIGS. 4 and 9 are perspective views of the feeder portion of the rotary drum screener 100 according to embodiments shown in FIGS. 1 and 5, respectively. In the example embodiments shown in FIGS. 4 and 9, the air nozzle 130 is mounted to an outer rim of the feeder 102 and oriented to blow air toward an opening 109 within the rotary bearing 110 through which plastic pieces are fed into the rotary drum 104. This configuration works to prevent or mitigate blockages that may occur at the interface between the feeder 102 and the rotary drum 104 (i.e., at the opening 109 within the rotary bearing 110 between the feeder 102 and the rotary drum 104).

Figure 6:
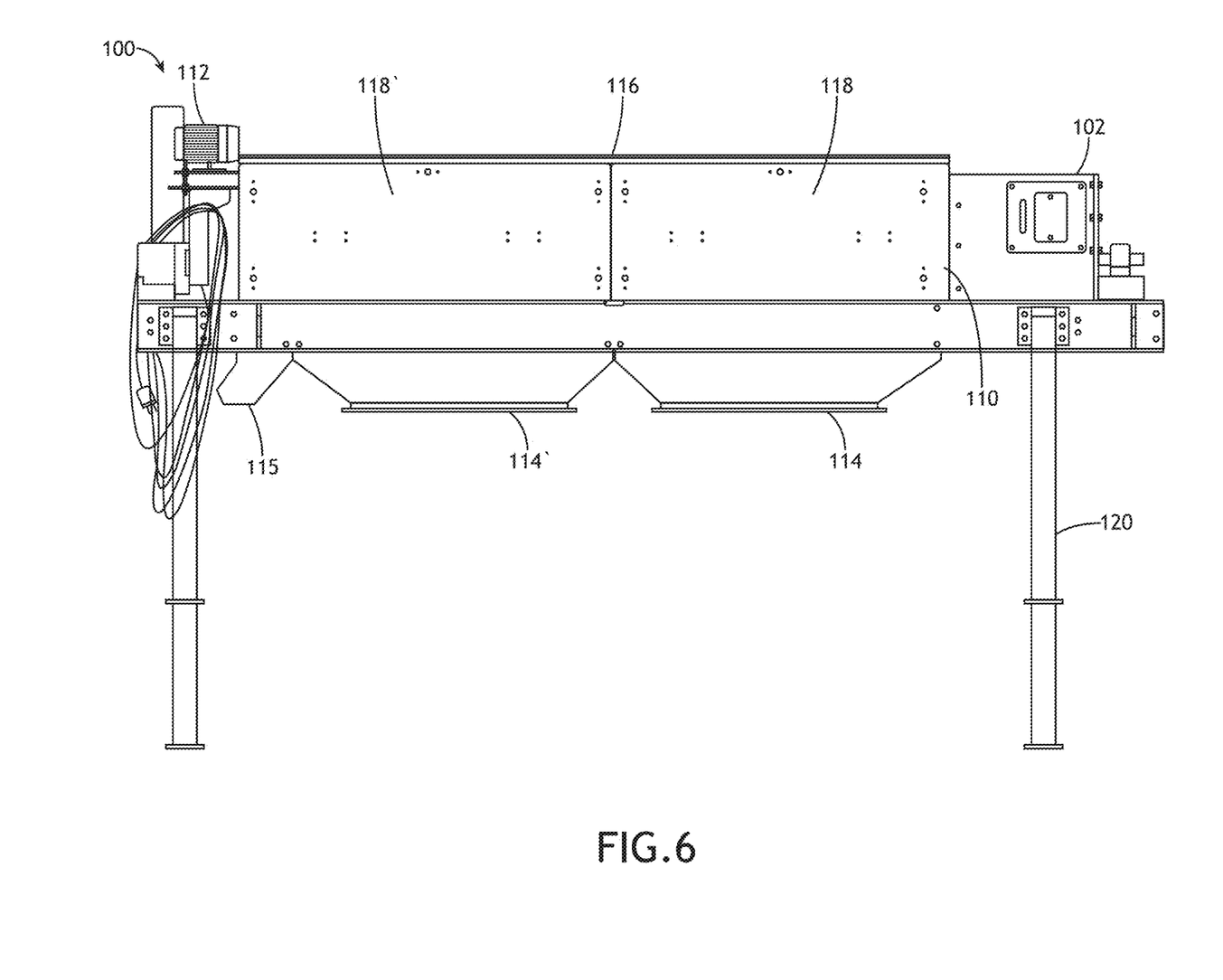
FIG. 6 is a side view of the rotary drum screener of FIG. 5, wherein the drum cover portions of the housing are in place, in accordance with an example embodiment of the present disclosure.
Figure 7:
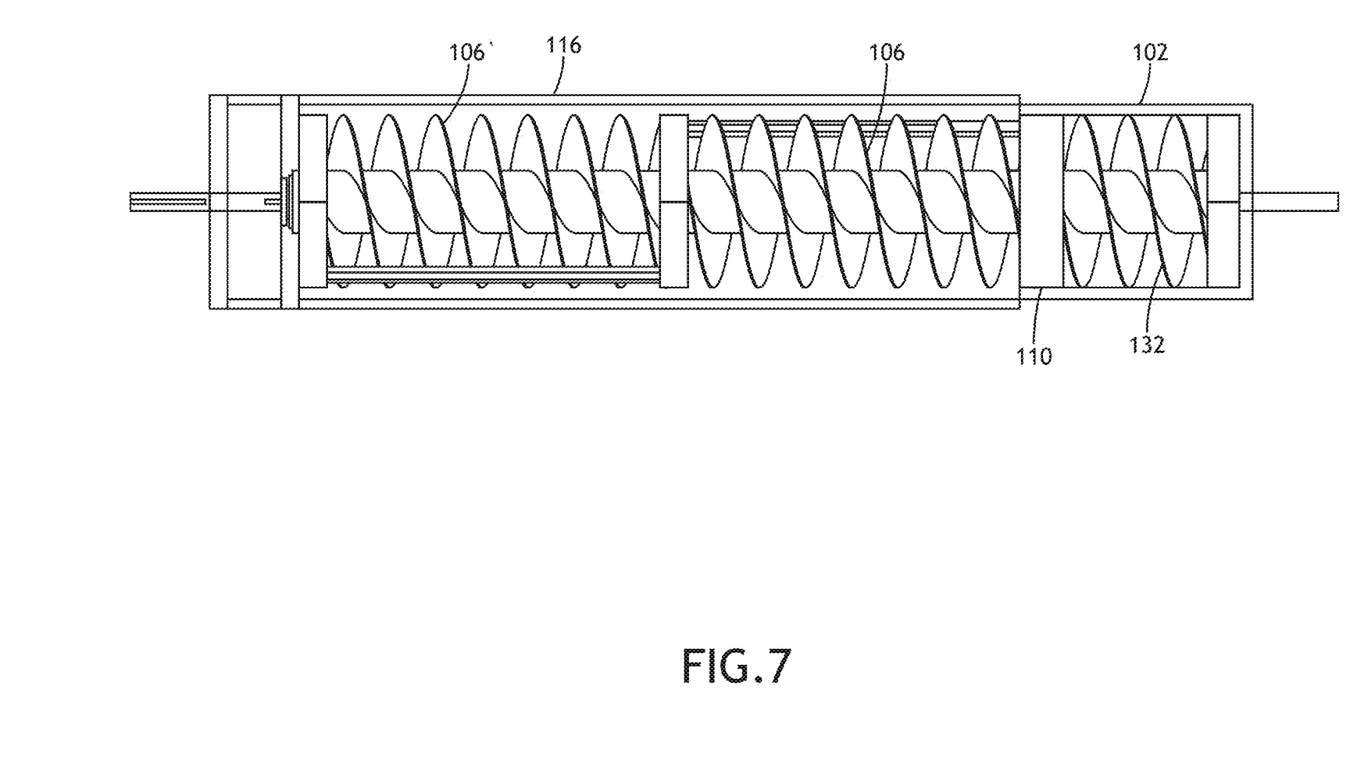
FIG. 7 is a top view of the rotary drum screener of FIG. 5, wherein the rotary drums (or drum sections) are depicted with their perforated screens removed to show how the helical blades (or blade sections) are integrated with the helical blade (or blade section) that extends into the feeder, in accordance with an example embodiment of the present disclosure.

Referring now to FIGS. 5 through 9, in some embodiments, the rotary drum screener 100 further includes a helical blade 132 that extends from the rotary drum 104 into the feeder 102 to prevent or mitigate blockages in the feeder 102 (or between the feeder 102 and the drum 104) by agitating plastic pieces as they pass through the feeder 102. As shown in FIGS. 5 and 6, the feeder 102 may be elongated to fit the helical blade 132. This secondary helical blade 132 is connected to or a continuation of the helical blade 106 of the rotary drum 104. FIG. 7 is a top view of the rotary drum screener 100 according to the embodiment shown in FIG. 5, wherein the rotary drums 104 and 104' are depicted with their perforated screens 108 and 108' removed to show how the helical blades 106 and 106' (or blade sections) are integrated with the helical blade 132 (or blade section) that extends into the feeder 102. FIG. 8 is a top view of an integrated blade assembly made up of helical blades 106, 106', and 132, wherein the blades are all connected or fused together and configured to rotate about a common axle 134 that is fixedly or rotatably coupled to the blades.

In some embodiments, the feeder 102 may include one or more air nozzles in addition to the helical blade 132 to further assist in preventing or mitigating blockages. For example, the feeder 102 may include air nozzle 130 as described above and shown in FIG. 9. Additionally, or alternatively, the feeder 102 may include at least one air nozzle 140 that is mounted to an outer rim of the feeder 102 and oriented to blow air onto the helical blade 132 that extends from the rotary drum 104 into the feeder 102. For example, in some embodiments, the air nozzle 140 may be configured to blow air through a notch in a collar 138 coupled between the inner surface of the feeder 102 and a rotary bearing 136 for the helical blade 132 within the feeder 102. In other embodiments, the air nozzle 140 is located anywhere on the outer rim of the feeder 102 (or within the feeder 102) and pointed at the blade 132.

Figure 10:
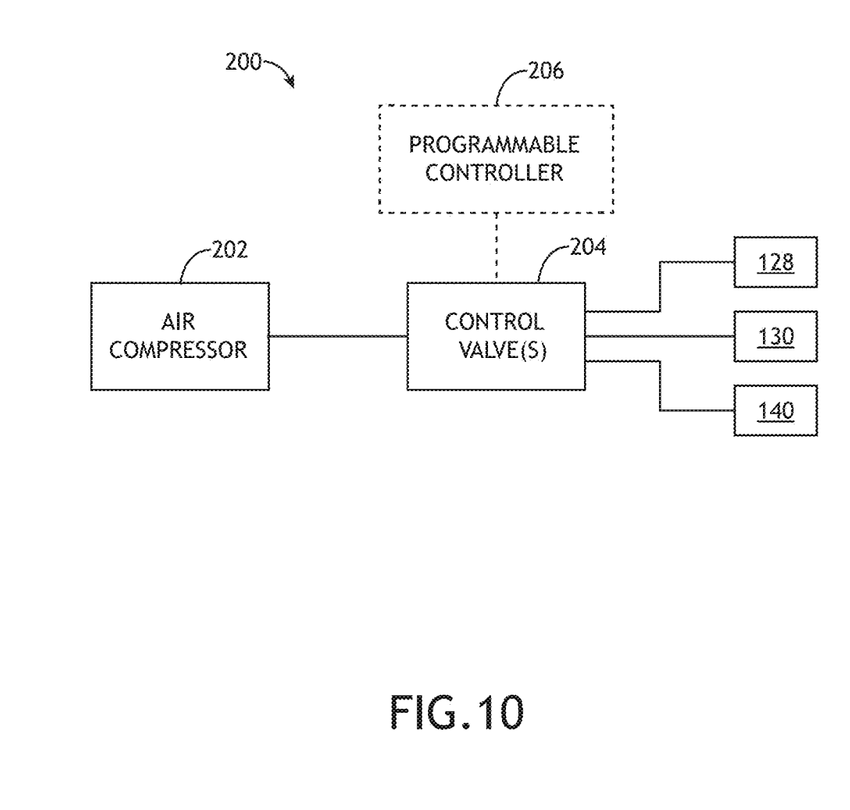
FIG. 10 is a block diagram of a system for controlling one or more air nozzles, in accordance with an example embodiment of the present disclosure.

FIG. 10 is a block diagram of a system 200 for controlling one or more air nozzles (e.g., air nozzle 128, air nozzle 130, and/or air nozzle 140), in accordance with an example embodiment of the present disclosure. The system 200 may include an air compressor 202 configured to provide pressurized air to the one or more air nozzles. In embodiments, the air nozzles may comprise flat air nozzles (e.g., air knives) or any other type of air nozzle appropriate for providing air displacement to prevent or clear blockages within the rotary drum screener 100. The system 200 may further include one or more control valves 204 configured to selectively enable/disable air flow to the one or more air nozzles. In some embodiments, each air nozzle may have its own control valve 204. Alternatively, one control valve may enable/disable air flow to all of the air nozzles. The air flow can be enabled/disabled on demand by manually operating the control valve(s) 204. However, in preferred embodiments, the control valve(s) 204 are electromechanical valves configured to be selectively enabled/disabled by a programmable controller 206 (e.g., microcontroller or any other programmable logic device). The system 200 can blow air continuously or on-demand via manual operation of the one control valves 204, or via user input to the programmable controller 206, or the system 200 can blow air periodically based the controller's programming and/or user input to the programmable controller 206.

Figure 11:
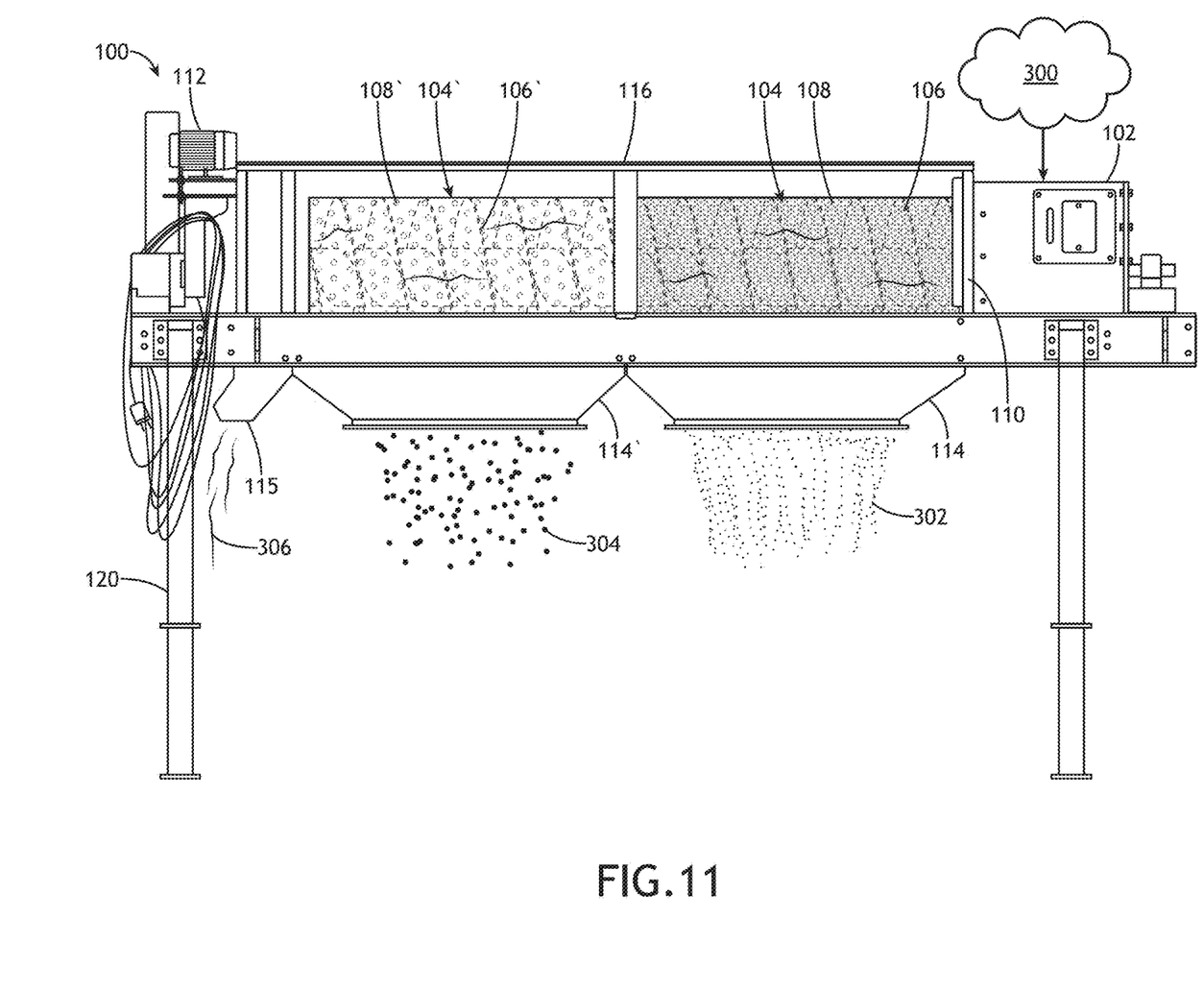
FIG. 11 is a side view of the rotary drum screener of FIG. 5, wherein a batch of plastic pieces is fed into the screener, first and second portions of the batch of plastic pieces are separated by first and second drum sections of the screener with increasing maximum hole diameter from one drum screen section to the next, and a remaining portion of the batch of plastic pieces is discarded at an output at the end of the screener, in accordance with an example embodiment of the present disclosure.

A method of separating differently sized plastic pieces and filtering out strands is described below, with reference to FIG. 11, which is a side view of the rotary drum screener 100 according to the embodiment shown in FIG. 5. FIG. 11 shows a batch 300 of plastic pieces being fed into the screener 100, first and second portions (e.g., plastic pieces 302 and (larger) plastic pieces 304) of the batch of plastic pieces being separated by first and second sections (e.g., drums 104 and 104') of the screener 100 with increasing maximum hole diameter from one drum screen section to the next, and a remaining portion (e.g., plastic strands 306, or plastic pieces larger than plastic pieces 304) of the batch of plastic pieces being discarded at an output at the end of the screener 100. In conjunction with the foregoing steps, the rotary drum screener 100 performs one or more of the operations described above to prevent or mitigate blockages: (i) blowing air into at least one section of the screener (e.g., into drum 104 and/or drum 104'); (ii) blowing air into the feeder 102; and/or (iii) mechanically agitating plastic pieces with helical blade 132 as they pass through the feeder 102.

Although methodology for separating differently sized plastic pieces and filtering out strands is described with reference to the rotary drum screener 100 as shown in FIG. 11, different types of screeners can be used with similar processes preventing or mitigating blockages while screening plastics. A more generalized method for separating differently sized plastic pieces and filtering out strands is described below.

In embodiments, a method of separating differently sized plastic pieces and filtering out strands may include steps of: feeding a batch of plastic pieces into a screener (e.g., a rotary drum screener, a vibratory screener, a flip-flow screener, or any other type of screener), wherein the screener includes at least one section with a perforated screen that is transmissive to plastic pieces with a diameter smaller a maximum hole diameter of the perforated screen; and separating a portion of the batch of plastic pieces that is transmitted through the perforated screen from a remaining portion of the batch of plastic pieces that is discarded at an output of the screener or fed into a next section of the screener. In embodiments, the method further includes a step for preventing or mitigating blockages by blowing air into the at least one section of the screener, blowing air into a feeder for the screener, and/or mechanically agitating plastic pieces with a helical blade as they pass through the feeder.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A rotary drum screener, comprising:
    a feeder configured to receive plastic pieces to be screened and further configured to direct the plastic pieces through an opening within a rotary bearing;
    a rotary drum that is connected to the rotary bearing and configured to receive the plastic pieces from the feeder, the rotary drum including a helical blade surrounded by a perforated screen that is transmissive to plastic pieces with a diameter smaller a maximum hole diameter of the perforated screen;
    a housing for the rotary drum;
    a collar coupled between the rotary bearing and an inner surface of the housing, wherein the collar includes a notch; and
    at least one air nozzle mounted to the inner surface of the housing and oriented to blow air into the rotary drum through the notch in the collar, wherein the at least one air nozzle is configured to blow air directly onto the helical blade within the rotary drum to prevent or mitigate blockages in the rotary drum.

2. The rotary drum screener of claim 1, wherein the rotary drum includes multiple drum screen sections with increasing maximum hole diameter from one drum screen section to a next drum screen section.

3. The rotary drum screener of claim 1, wherein the rotary drum is connected to one or more additional rotary drums with increasing maximum hole diameter from one rotary drum screen to a next rotary drum screen.

4. The rotary drum screener of claim 1, further comprising:
    at least one additional air nozzle configured to blow air into the feeder to prevent or mitigate blockages.

5. The rotary drum screener of claim 4, wherein the at least one additional air nozzle is mounted to an outer rim of the feeder and oriented to blow air toward the opening within the rotary bearing.

6. A rotary drum screener, comprising:
    a feeder configured to receive plastic pieces to be screened and further configured to direct the plastic pieces through an opening within a rotary bearing;
    a rotary drum that is connected to the rotary bearing and configured to receive the plastic pieces from the feeder, the rotary drum including a helical blade surrounded by a perforated screen that is transmissive to plastic pieces with a diameter smaller a maximum hole diameter of the perforated screen;
    a second helical blade that extends from the rotary drum into the feeder to prevent or mitigate blockages by agitating the plastic pieces as they pass through the feeder; and
    at least one air nozzle mounted to an outer rim of the feeder and configured to blow air directly onto the second helical blade within the feeder to prevent or mitigate blockages in the feeder.

7. The rotary drum screener of claim 6, wherein the second helical blade is connected to or a continuation of the helical blade of the rotary drum.

8. The rotary drum screener of claim 6, wherein the rotary drum includes multiple drum screen sections with increasing maximum hole diameter from one drum screen section to a next drum screen section.

9. The rotary drum screener of claim 6, wherein the rotary drum is connected to one or more additional rotary drums with increasing maximum hole diameter from one rotary drum screen to a next rotary drum screen.

10. The rotary drum screener of claim 6, further comprising:
   at least one additional air nozzle configured to blow air into the rotary drum to prevent or mitigate blockages.

11. The rotary drum screener of claim 10, further comprising:
   a housing for the rotary drum; and
   a collar coupled between the rotary bearing and an inner surface of the housing, wherein the at least one additional air nozzle is mounted to the inner surface of the housing and oriented to blow air into the rotary drum through a notch in the collar.

* * * * *